Dec. 23, 1930.  L. LEA ET AL  1,786,309
LEVEL
Filed Nov. 9, 1927
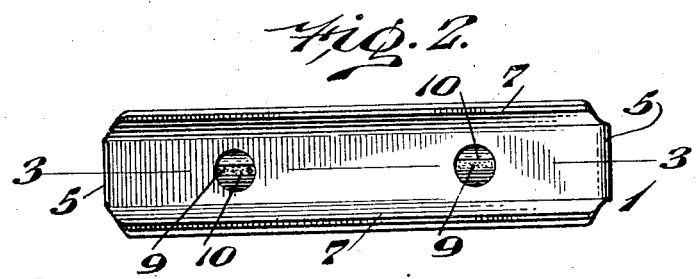
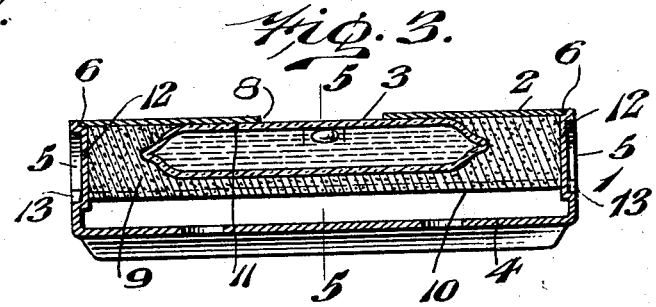
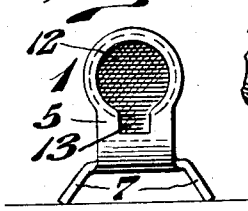 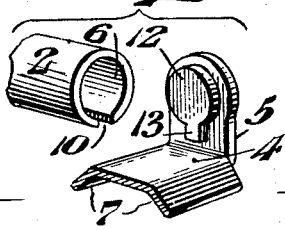 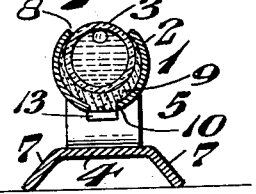
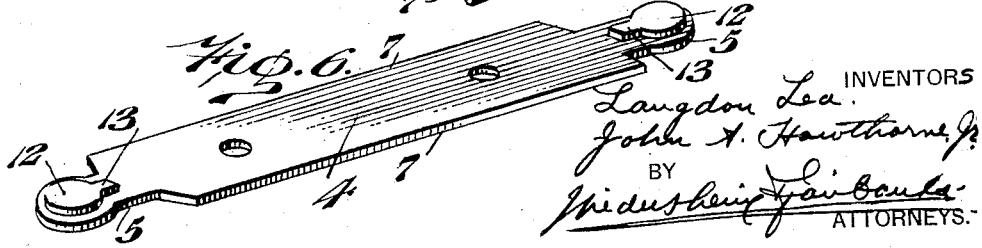
INVENTORS
Langdon Lea.
John A. Hawthorne, Jr.
BY
ATTORNEYS.

Patented Dec. 23, 1930

1,786,309

UNITED STATES PATENT OFFICE

LANGDON LEA, OF WYNNEWOOD, AND JOHN A. HAWTHORNE, JR., OF MOORES, PENNSYLVANIA

LEVEL

Application filed November 9, 1927. Serial No. 232,017.

Our invention relates to a new and useful level and method of making the same, whereby a level giving constant accurate readings without the aid of auxiliary adjusting devices is produced and whereby the cost of producing such level is greatly reduced.

It has been the practice heretofore loosely to position the level indicating vial or element within a cylindrical sleeve or casing and to mount such casing on a support comprising a relatively broad or wide base of considerable area which necessarily had to be accurately ground to a true horizontal plane to give accurate reading. As is well known the process of grinding and truing the wide broad bottom of the level support is a tedious, time consuming and expensive process. Furthermore due to the inaccurate positioning of the indicating vial within its casing it was necessary to employ adjustment set screws which were necessary to bring the level to the "zero" reading before the level could be used.

It is the object of our invention to eliminate the use of adjustment screws by the employment of a filling of a slowly setting or hardening plastic material which permits of the accurate adjustment and positioning of the indicating vial within the casing before said material sets and by the provision of a novel casing construction for said vial which provides access thereto before the material surrounding the lower portion thereof has set or hardened and through which the plastic material may be inserted in the proper amount and evenly and properly distributed.

A further object of our invention is greatly to reduce the amount of grinding necessary for the proper truing of the bottom, base or support of the level casing thus effecting a considerable saving in the material and time consumed and consequently greatly reducing the cost of manufacture.

To the above ends our invention consists in providing a cylindrical metallic casing, with a central top opening and a bottom longitudinal slot, inserting an indicating vial through one end of said casing, filling the space at either end of said vial with a slowly setting plastic material, adjusting said vial level through said bottom slot, and filling the space beneath said vial with plastic material inserted through said bottom slot, and mounting said casing on a support.

Our invention further consists in providing a support for the casing consisting of a bottom blank having opposed disk like terminal ends or heads adapted to be deflected upwardly to clamp and support the vial casing therebetween, said blank being also provided on its bottom side with integral, longitudinal parallel diverging supporting edges, which serve as feet.

Our invention further consists in providing means for interlocking the end heads of the supporting member with ends of the vial casing clamped therebetween to lock the latter against rotary movement and thereby constantly to maintain the indicating vial within said casing in its uppermost normal position.

Our invention further consists of the novel features of construction and advantage hereinafter described and claimed.

For the purpose of illustrating our invention we have shown in the accompanying drawings one form thereof which is at present preferred by us, since the same has been found in practice to give satisfactory and reliable results, although it is to be understood that the various instrumentalities of which our invention consists can be variously arranged and organized and that our invention is not limited to the precise arrangement and organization of the instrumentalities as herein shown and described.

In the accompanying drawings:—

Fig. 1 represents a side elevation of a level embodying our invention.

Fig. 2 represents a bottom plan view of the same.

Fig. 3 represents a section on line 3—3 Fig. 2.

Fig. 4 represents an end view of Fig. 1.

Fig. 5 represents a section on line 5—5 of Fig. 3.

Fig. 6 represents a perspective view of the blank employed before bending.

Fig. 7 represents a fragmentary perspective view showing the manner in which the ends of the vial casing are clamped and interlocked.

Fig. 8 represents on an enlarged scale a fragmentary sectional view on line 8—8, Fig. 1.

Referring to the drawings, in which like reference characters indicate like parts, 1 designates a level embodying our invention, comprising the vial casing 2, indicating vial 3 and base member 4. The base member 4 is provided at either end with the integral dished heads 5, which are adapted to be deflected upwardly to close the open ends 6 of the vial casing 2, and to clamp and support the casing therebetween as will be clearly seen from Figs. 1 and 3. The base member 4 is further provided with the integral parallel, longitudinal supporting members 7, on which the level rests while in use. The indicating vial 3 is of any suitable construction and may be seen or read through the upper window or opening 8 in the casing 3, as will be understood from Figs. 1, 3 and 5.

In assembling our invention we first insert the indicating vial 3 into the casing 2 through either end 6 thereof and having centered the same with respect to the opening 8, the space at either end of the vial is filled with a slowly setting or hardening plastic material 9. In order to permit of the thorough adjustment of the vial 3 we employ a plastic material consisting of a mixture of japan drier, dry white lead, fuller's earth and linseed oil, this composition having been found to set or harden in about twelve hours, thus leaving ample time for adjustment of the indicating vial. After the vial 3 has been accurately adjusted, the space below said vial is then filled with the same plastic material through the bottom slot 10 provided in the bottom of the casing 2, it being understood that the upper surface of the vial 3 is pressed up against and contacts with the upper side 11 of the casing which is of a true horizontal or plane, thus aiding the accurate positioning of said vial. The casing 2, containing the vial 3 and properly packed is then clamped and supported between the end heads 5 of the supporting member or base 4. The heads 5 are provided with the counterbores 12 which snugly fit into and engage the open ends 6 of the casing 2 thus forming a closure for said ends and at the same time supporting said casing in the horizontal position as will be understood from Figs. 1, 3 and 4. Integral with the counterbores 12 on the inner faces of the ends 5 are provided the lower locking tongues 13 which fit into and engage the respective ends of the slot 10 in the bottom of the casing 2 thereby to lock the latter in position against any rotary movement as will be clearly seen in Fig. 7.

It will thus be seen that the heads 5 serve to close the open ends of said casing and to prevent the rotation of the same as will be understood from Figs. 1, 3 and 7. Subsequent to the mounting of the casing 2 on the base 4 the knife edge terminals of the feet or base members 7 are ground on a suitable abrasive surface until by the reading of the indicating vial, a true horizontal or plane surface on said terminals has been reached. By the employment of the narrow bottom knife edge terminals of the base members 7, in lieu of the conventional relatively broad or wide solid base heretofore employed, the amount of grinding necessary to impart a true horizontal plane to said base members 7 is greatly reduced, since in our device, the surface to be ground and trued is reduced to a minimum thus effecting a considerable saving in the time and labor consumed and resulting in a more accurate and true plane than can be imparted to a relatively flat, broad base or support, as will be understood from Fig. 8 wherein we have illustrated the extent to which the bottoms of the feet or base members 7 are ground.

It will be further apparent that the base 4 of our novel construction and its adjuncts can be produced by a single stamping or punching operation as will be understood from Fig. 6, and this is equally true of the cylindrical casing 2. It will also be seen that the assembling of the vial with respect to its casing and the clamping of the casing between the end heads 5 of the supporting member 4 can be performed in a minimum time and at a minimum effort, thus resulting in an exceedingly inexpensive article which at the same time inherently possesses all the advantages of accuracy and reliability.

It will be seen from the foregoing that our novel device consists of but two elements the vial casing and the bottom support therefor, the construction of which latter before bending, will be understood from Fig. 6, while the construction of the assembled parts will be understood from Fig. 3.

If desired the liquid contained in the indicating vial 3 may be suitably colored to facilitate the reading thereof.

It will now be apparent that we have devised a novel and useful construction which embodies the features of advantage enumerated as desirable in the statement of the invention and the above description and while we have in the present instance shown and described the preferred embodiment thereof which has been found in practice to give satisfactory and reliable results, it is to be understood that the same is susceptible of modification in various particulars without departing from the spirit or scope of the invention or sacrificing any of its advantages.

Having thus described our invention, what we claim as new and desire to secure by Letters Patent, is:—

1. A level of the character stated, comprising an upper casing having a top opening and a bottom slot extending longitudinally the entire length thereof, an indicating vial positioned within said casing and centered with respect to said top opening, the spaces on either end of and below said vial within said casing being packed with a slowly setting plastic material, and a support for said casing comprising a longitudinal member provided with end heads clamped against and forming closures for the ends of said casing, and provided with tongues for engaging the ends of said casing slot, said support being provided with narrow, longitudinal bottom edges.

2. A level of the character stated, comprising an upper casing having a top opening and a bottom longitudinal slot, an indicating vial positioned within said casing and centered with respect to said top opening, the spaces on either end of and below said vial within said casing being packed with a slowly setting plastic material, and a support for said casing comprising a longitudinal base member provided with end heads clamped against the ends of said casing and provided with narrow, longitudinal bottom edges, said end heads having studs adapted to seat in and fit the ends of said casing and locking tongues adapted to engage the ends of the bottom slot in said casing to prevent the rotation of the latter.

3. In a device of the character stated, a level composed of a bottom member having diverging longitudinally extending feet provided with narrow bottom edges, end heads extending vertically from said bottom member and a vial casing having its ends clamped between said heads, said vial casing having a bottom slot extending longitudinally throughout its length and the inner face of said heads each having a stud fitting into said casing together with a locking tongue seated in the ends of said casing slot.

LANGDON LEA.
JOHN A. HAWTHORNE, Jr.